Worcester & Perkins,
Flour Sieve.
Nº 56,317. Patented July 10, 1866.
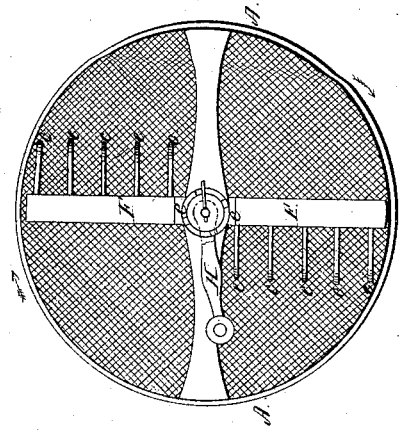
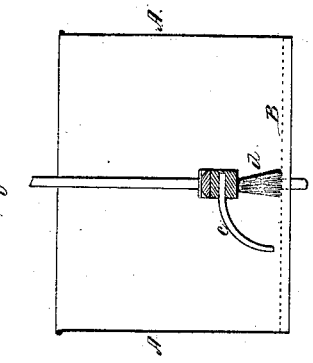
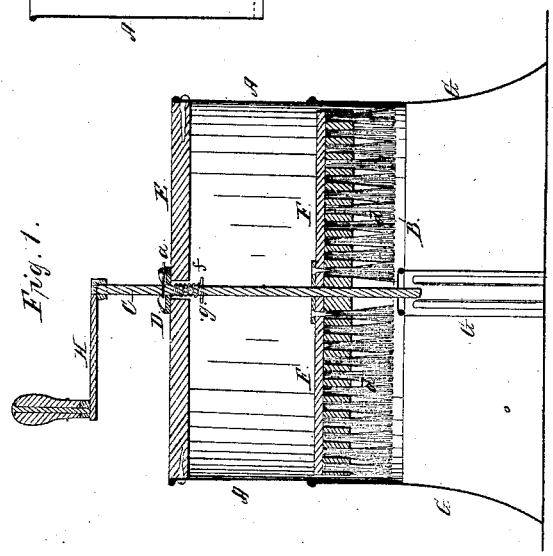
Witnesses:
H. L. Fuller
D. W. Hawkins
Inventor:
R. F. Worcester
J. B. Perkins
Thos. H. Dodge

UNITED STATES PATENT OFFICE.

K. F. WORCESTER, OF NASHUA, AND J. B. PERKINS, OF HOLLIS, N. H.

IMPROVEMENT IN FLOUR-SIFTERS.

Specification forming part of Letters Patent No. 56,317, dated July 10, 1866.

*To all whom it may concern:*

Be it known that we, K. F. WORCESTER, of Nashua, in the county of Hillsborough and State of New Hampshire, and J. B. PERKINS, of Hollis, in said county and State, have invented certain new and useful Improvements in Flour-Sifters; and we do hereby declare that the following is a full, clear, and exact description of the same, reference being had to the accompanying drawings, forming a part of this specification, in which—

Figure 1 represents a vertical central section of our improved flour-sifter. Fig. 2 represents a top or plan view; and Fig. 3 represents a section at right angles to the line of section in Fig. 1, the line of section being on one side of the center of the body of the sifter.

In the drawings, A represents the body of the sifter, made of tin or other suitable material, in which the flour to be sifted is placed; B, the sieve, which is placed at the bottom of the body or receptacle A. C is the crank-shaft, supported near its upper end by pin $a$, which rests upon the cam-piece D, which, in turn, is supported by a brace or cross-piece, E, which extends across the top of vessel A. The lower end of shaft C passes through and turns on bridge-piece $b$, which extends across the bottom of vessel A under sieve B. Attached to the lower end of crank-shaft C are two arms, F F, to which are fastened curved fingers $c\,c$ and brushes $d\,d$, which are caused to revolve horizontally by the motion of shaft C. The body A is supported by legs G G G.

The operation is as follows: The flour to be sifted is put into the receptacle A. Motion is given to shaft C by means of crank H, when the arms F F, with their fingers $c$ and brushes $d$, are rotated in the direction of the arrows, Fig. 2. Fingers $c$ stir up the flour and break up any lumps therein, while the brushes $d$ keep the meshes of sieve B open and facilitate the sifting of the flour. The upper surface of cam-piece D is provided with a series of cams, $e\,e$, over which pin $a$ moves when shaft C is in operation, whereby a constant up-and-down motion is imparted to the arms F F, fingers $c$, and brushes $d$, and as the result of such motion there is less liability of hard pieces of foreign matter being forced through the sieve than there would be if the brushes were allowed to press constantly upon sieve B, since when the brushes rise they pass all such foreign substances. Again, by the rising of the fingers lumps of good flour are broken, and consequently offer less resistance to the operation of sifting.

In order to insure the immediate fall of the fingers and brushes after they have been raised, a spring, $f$, is applied to shaft C, as shown in Fig. 1, so that when shaft C is raised pin $g$ will compress spring $f$, which, in turn, forces shaft C down as soon as pin $a$ passes one of the cam-surfaces $e$.

Having described our improved flour-sifter, what we claim as of our invention, and desire to secure by Letters Patent, is—

The combination, with the fingers $c$ and brushes $d$, secured to the shaft of the machine, as herein set forth, of the cams and pins and spring, or equivalent mechanism, for giving a constant up-and-down motion to the same, the whole being constructed and arranged for operation substantially as and for the purposes herein shown and described.

K. F. WORCESTER.
J. B. PERKINS.

Witnesses:
GEO. Y. SAWYER, Jr.,
GEO. Y. SAWYER.